US005539286A

United States Patent [19]

Brinkmeyer et al.

[11] Patent Number: 5,539,286

[45] Date of Patent: Jul. 23, 1996

[54] MOTOR VEHICLE ELECTRICAL SYSTEM HAVING AN ELECTRICAL MACHINE FUNCTIONING AS AN ON-BOARD POWER SUPPLY GENERATOR

[75] Inventors: Horst Brinkmeyer, Waiblingen; Wolf-Dieter Blauensteiner, Ostfildern; Thomas Binder, Korb; Gunter Loose, Remseck; Alfred Wirth, Oberdischingen; Gerhard Muenkel, Fellbach; Reinhard Steinkaemper, Winnenden, all of Germany

[73] Assignee: Mercedes-Benz AG

[21] Appl. No.: 327,796

[22] Filed: Oct. 20, 1994

[30] Foreign Application Priority Data

Oct. 20, 1993 [DE] Germany .......................... 43 35 771.7

[51] Int. Cl.$^6$ ........................................ H02P 9/06

[52] U.S. Cl. .............................. 318/139; 322/28; 322/29; 318/147; 307/10.1

[58] Field of Search .................................... 318/139, 140, 318/146, 147, 149, 157; 307/10.1, 16, 18, 29, 75; 320/2, 61; 322/7, 8, 17, 18, 24, 25, 28, 29, 37

[56] References Cited

U.S. PATENT DOCUMENTS

| | | |
|---|---|---|
| 4,239,978 | 12/1980 | Kofink . |
| 4,604,528 | 8/1986 | Norton . |
| 4,673,797 | 6/1987 | Weirick . |
| 4,730,097 | 3/1988 | Campbell et al. . |
| 5,175,439 | 12/1992 | Harer et al. . |
| 5,418,401 | 5/1995 | Kaneyuki . |

FOREIGN PATENT DOCUMENTS

| | | |
|---|---|---|
| 0246976 | 11/1987 | European Pat. Off. . |
| 2441086 | 3/1976 | Germany . |
| 2837922 | 3/1980 | Germany . |
| 3124102 | 2/1982 | Germany . |
| 3743317 | 6/1989 | Germany . |
| 3919562 | 12/1990 | Germany . |
| 4230597 | 8/1993 | Germany . |

*Primary Examiner*—Bentsu Ro

*Attorney, Agent, or Firm*—Evenson, McKeown, Edwards & Lenahan

[57] ABSTRACT

A motor vehicle electrical system has an electrical machine with an on-board power supply generator function. The electrical machine can be operated, in a first mode, as an on-board power supply generator, having a regulator for setting the excitation current for the electrical machine, and having an electrical load having a comparatively high power consumption, for example a heating device for an exhaust gas catalytic converter. A changeover switch, by means of which an output of the electrical machine can optionally be connected to an on-board power supply cable or to the load, as well as a control unit for controlling the regulator and changeover switch optionally in the first mode or a second mode, is provided so that the electrical machine is connected to the on-board power supply and the regulator regulates the operating voltage at an on-board power supply voltage. Alternatively, the electrical machine is connected to the load and the regulator regulates the operating voltage at a higher nominal value. In addition to these two functions, a third function as a starter motor is provided for the electrical machine.

5 Claims, 3 Drawing Sheets

MOTOR VEHICLE ELECTRICAL SYSTEM HAVING AN ELECTRICAL MACHINE FUNCTIONING AS AN ON-BOARD POWER SUPPLY GENERATOR

BACKGROUND AND SUMMARY OF THE INVENTION

The invention related to a motor vehicle electrical system and, more particularly, to a motor vehicle electrical system having an electrical machine which can be operated in a first mode as an on-board power supply generator and, in a second mode, for supplying an electrical load which has a comparatively high power consumption.

In most motor vehicles, an on-board power supply generator is provided. The on-board power supply has an operating voltage regulated by a regulator through suitable adjustment of the generator excitation current. Furthermore, in most motor vehicles there are frequently electrical loads having a comparatively high power consumption, for example a heating device for an exhaust gas catalytic converter which can be electrically heated. The exhaust gas catalytic converter does not operate optimally until it reaches a specific operating temperature. In order to quickly reach this temperature during the starting phase of the motor vehicle engine, brief heating of the exhaust gas catalytic converter is frequently provided at high power, for example, 6 kW or more.

German patent document DE 42 30 597 C1 discloses a motor vehicle electrical system in the case of which the electricity for the electrical heating of the exhaust gas catalytic converter is produced by a separate generator which is exclusively provided for this purpose. The production of electricity is regulated by means of a controllable coupling between the generator and the internal combustion engine.

The German patent document DE 39 19 562 A1 discloses motor vehicle electrical systems in the case of which a common generator operates as an on-board power supply generator and is also used for supplying a heating resistor. In order to provide an increased generator voltage for supplying the heating resistor, various types of circuitry measures are disclosed. For example, the splitting of the generator operation is disclosed, which is provided in accordance with this generic type, into a first mode as an on-board power supply generator and into a second mode for a heating resistor supply.

The German patent document DE 24 41 086 discloses a speed-regulating V-belt drive which couples one or more units to the motor vehicle engine shaft. The coupling is in such a manner that the speed of the unit is reduced as the engine speed increases and the speed of the unit is increased as the engine speed reduces. This is accomplished by the V-belt being held on different pulley radii by centrifugal bodies.

The German patent document DE 37 43 317 A1 discloses a motor vehicle electrical system in the case of which an electrical machine can be operated on the one hand as an on-board power supply generator and on the other hand as a starter motor, for which purpose a suitable direct-current intermediate circuit is connected between the electrical machine and the vehicle battery as well as the on-board power supply loads.

There is therefore needed a motor vehicle system in the case of which, at a relatively low cost and with few components, both reliable on-board power supply and an at least brief supply of an electrical load having a comparatively high power consumption, especially a heating device for an exhaust gas catalytic converter, are ensured.

These needs are met according to the present invention by a motor vehicle system having an electrical machine which can be operated in a first mode as an on-board power supply generator and, in a second mode, for supplying an electrical load which has a comparatively high power consumption. A regulator sets the excitation current for the electrical machine. A controllable changeover switch is provided. A control unit controls the operation of the regulator and changeover switch optionally in the first mode or a second mode. In the first mode, the changeover switch connects the supply voltage output of the electrical machine to an on-board power supply cable. The regulator regulates the operating voltage of the electrical machine at a lower nominal value which is suitable for the on-board power supply. In the second mode, the changeover switch connects the supply voltage output of the electrical machine to the connection of the electrical load having a comparatively high power consumption. The regulator regulates the operating voltage of the electrical machine at a higher nominal value which is suitable for supplying power to this load. A coupling device, which couples the shaft of the electrical machine to a motor vehicle engine shaft is provided with a step-up ratio which is different in the two modes.

This solution provides an electrical machine which, on the one hand can carry out an on-board power supply generator function and, on the other hand, can supply the electrical load having a relatively high power consumption. For this purpose, the electrical machine can be suitably connected by means of the control unit, the changeover switch and the regulator, and can be mechanically coupled to the motor shaft via the drive coupling connection having a suitable step-up ratio in each case. Both the setting of a suitably increased generator excitation current and the selection of a higher step-up ratio, which results in an increased generator speed, contribute to achieving a higher generator output voltage for supplying the electrical load having a comparatively high power consumption. Consequently, there is no need for a separate electricity generator for the load having a comparatively high power consumption.

If the electrical machine is suitably designed and the operating point suitably selected then a considerably higher power than the rated power can in any case be taken, at an increased voltage, and made available to the load, for example an exhaust gas catalytic converter heater. This occurs briefly, by greater excitation. The associated cable cross-section and the losses occurring in the cable are kept low. For example, a generator having a rated power of 1.6 kW can briefly produce approximately 6 kW at a generator speed of 6000 rpm, an operating voltage of approximately 50 V being produced on the load. At a higher speed, the electrical power provided can be still further increased.

An advantageous embodiment of the drive coupling of the electrical machine to the motor vehicle engine shaft is also provided. This has the advantage that the achievement of a higher generator output voltage for supplying the electrical load having a comparatively high power consumption is brought about both by setting a suitably increased generator excitation current and by the activation of the step-up belt drive. By means of this, the electrical machine is mechanically coupled to the motor vehicle engine at a higher step-up ratio than when the normal belt drive is activated so that the generator speed which is increased in this way likewise contributes to the higher generator output voltage.

In a further embodiment of the invention, it is advantageous in design terms that the switching device be implemented by a friction locking coupling element to activate the step-up belt drive in the second mode and to deactivate it in the first mode. The friction-locking coupling element is designed in such a manner that, after the engine has been started, it produces a friction lock, for the purpose of the force-fitting connection. The friction lock is provided by means of the torque which acts from the engine shaft. The friction lock is automatically released on reaching a preselectable engine speed limit, for example by means of coupling element members which are operated by centrifugal force. The released connection and, thus, the deactivation of the friction-locking coupling element, are maintained during the further, running operation of the engine. This measure makes it possible for the electrical machine to be driven by the engine shaft, after the engine has been started, initially at a higher speed in the second mode, via the step-up belt drive, in order to provide a greater generator output power and, subsequently, at a lower speed in the first mode, via the normal belt drive, in order to provide the on-board power supply voltage. No external control of the friction-locking coupling element is required as a result of the automatic changeover in the friction-locking coupling element.

In a particularly advantageous embodiment of the present invention, the electrical machine can furthermore be operated in a third mode as a starter motor for starting the motor vehicle engine. In this case, the motor vehicle electrical system additionally has a current supply device for the armature circuit of the electrical machine. The control unit ensures that the regulator, the changeover switch, and this current supply device are suitably controlled. Consequently, it is initially possible to use the electrical machine in its third mode as a starter motor during starting of the motor vehicle and, once the running of the motor vehicle engine has been detected, then for a specific time period as a generator having a comparatively high output power and, subsequently, as an on-board power supply generator during the further, running operation of the motor vehicle.

The implementation of the third mode for the electrical machine as a starter motor is provided in a further embodiment which provides a third switching device in the form of a freewheel which, like the second switching device, acts on the step-up belt drive coupling. However, the free wheel acts in the opposite direction, that is to say it produces a force fit when the torque acts from the shaft of the electrical machine rather than from the engine shaft.

Other objects, advantages and novel features of the present invention will become apparent from the following detailed description of the invention when considered in conjunction with the accompanying drawings.

DETAILED DESCRIPTION OF THE DRAWINGS

Figure 1:
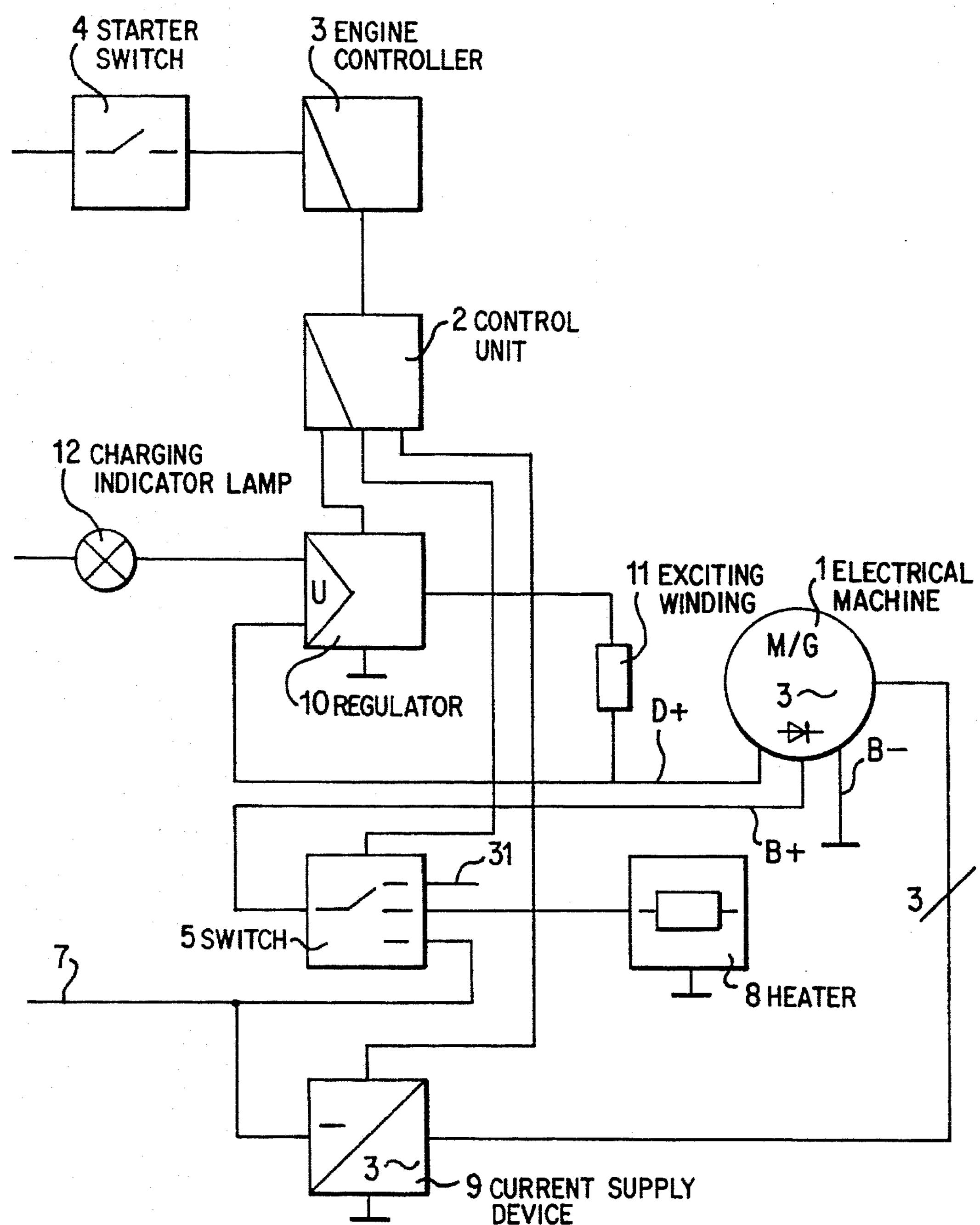
FIG. 1 is a schematic block diagram of a portion of the motor vehicle electrical system having an electrical machine which optionally functions as a starter motor, as an exhaust gas catalytic converter heating power source, or as an on-board power supply generator.

FIG. 1 illustrates the existing important component of the motor vehicle electrical system, and their wiring.

An electrical machine 1, which can optionally be operated as a motor or as a generator, forms a central component. The machine 1 has an excitation winding 11 which is shown separately. A regulator 10, whose output is connected to the one excitation winding connection, is used for setting a respectively desired excitation current by means of the excitation winding 11. In order to allow the excitation current to be set as a function of the error between the operating voltage of the electrical machine 1 during generator operation from a desired nominal value, the feedback parameter input of the regulator 10 is jointly connected to the other excitation winding connection and to the $D_+$ connection of the electrical machine 1, while a cable is connected to the other regulator signal input, which cable comes from a vehicle battery, which is not shown, via a charging indicator lamp 12, for charging monitoring and initial excitation. The $B_+$ output of the electrical machine 1 is connected to the input of an electrically controllable changeover switch 5. The changeover switch 5 can be switched between three positions, in order to optionally connect its input to one of three outputs. Of these outputs, a first forms a free connection 31, a second is connected to an electrical heating device for an exhaust gas catalytic converter 8 which is provided in the motor vehicle, while an on-board power supply cable 7 is connected to the third changeover switch output.

In order to provide a starter motor function for the electrical machine 1, a current supply device 9 is provided having a direct current input, which is connected to the on-board power supply cable 7, and having an alternating-current output, which is connected to the armature circuit of the electrical machine 1. The regulator 10, changeover switch 5 and current supply device 9 can be controlled by a control unit 2 which is provided for this purpose. The control unit 2 is linked on the input side to one output of a motor vehicle engine controller 3 which, for its part, receives the signal from a starter switch 4 on the input side. The control unit 2 is implemented, in the present example, as a separate component, but can alternatively be integrated in the engine controller 3 or in the regulator 10.

It is self-evident that, in addition to the electrical components which are relevant to the invention and are explicitly shown in FIG. 1, the motor vehicle electrical system in general contains further electrical components and circuit connections which are of no further interest here and are thus not shown. In addition, due to its motor vehicle engine controller, the engine controller 3 also indirectly influences the output alternator-current voltages of the electrical machine 1 and the current supply device 9. Consequently, the current density in the connecting cable between the current supply device 9 and the armature circuit of the electrical machine 1 is also indirectly influenced.

Figure 2:
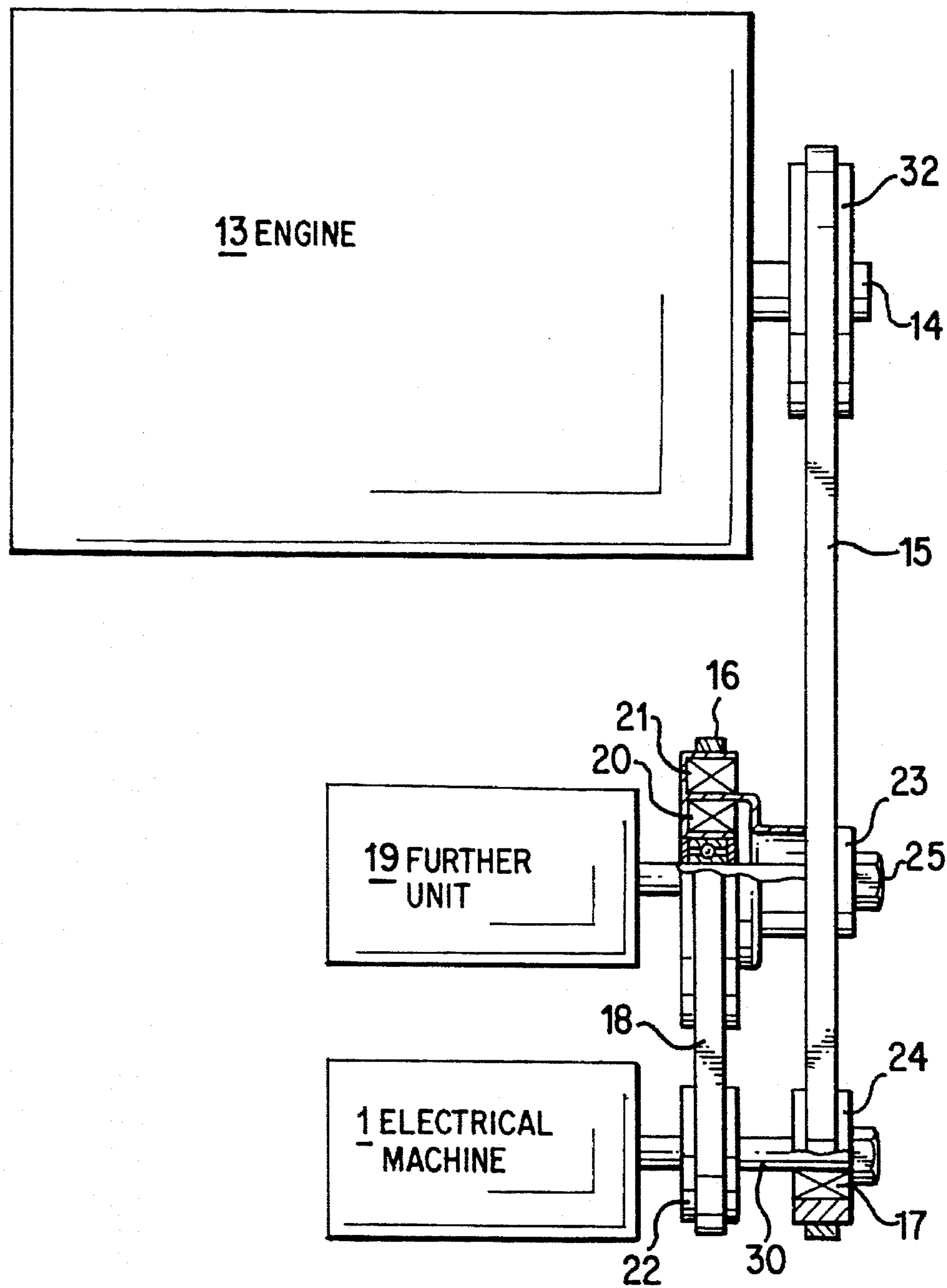
FIG. 2 is a schematic, partially cut-away side view of the belt coupling of the shaft of the electrical machine to the motor vehicle engine shaft, using an intermediate shaft.
Figure 3:
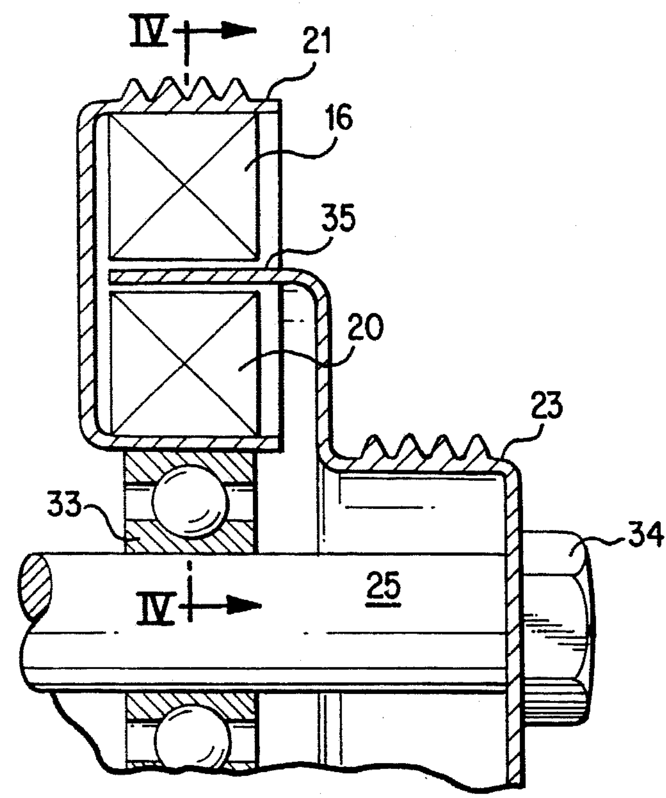
FIG. 3 is a schematic, halved sectional view of the region of the intermediate shaft in FIG. 2.
Figure 4:
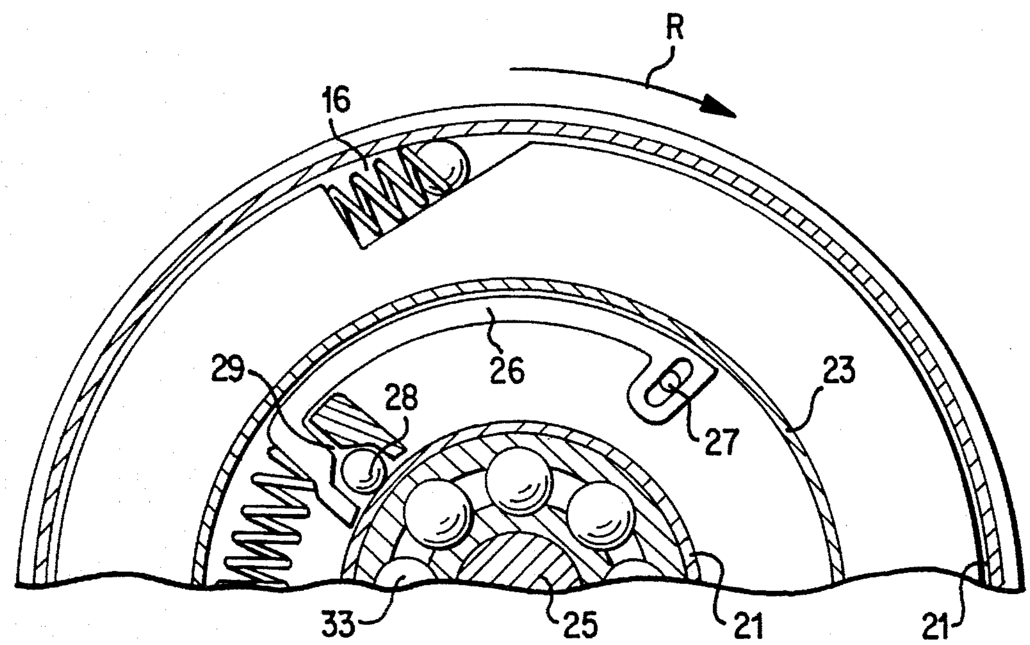
FIG. 4 is a sectional view along the line IV—IV in FIG. 3.

The electrical machine 1 is mechanically coupled to a motor vehicle engine 13, which is implemented as an internal combustion engine, in the manner shown in more detail in FIGS. 2 to 4. As can be seen especially in FIG. 2, the shaft 30 of the electrical machine 1 is connected on the one hand to the crank shaft 14 of the motor vehicle engine 13 via a normal belt drive. The normal belt drive consists of a pulley 32, which is seated in a rotationally fixed manner on the crank shaft 14, a pulley 24, which is fitted on the shaft 30 of the electrical machine 1, and a main belt 15. A freewheel 17 is provided between the shaft 30 of the electrical machine 1 and this pulley 24, as a switching device for the normal belt drive coupling. The freewheel 17 releases when the associated shaft 30 is driven faster than the associated pulley 24 while, otherwise, it produces a force-fitting connection. On the other hand, the shaft 30 of the electrical machine 1 is connected, via a step-up belt drive, to the crank shaft 14, indirectly via an intermediate shaft 25 which is provided by a further unit 19. The step-up belt drive contains a second belt level having a smaller pulley 22 which is seated in a rotationally fixed manner on the shaft 30 of the electrical machine 1, having a larger pulley 21 which is mounted in a rotationally moving manner on the intermediate shaft 25, opposite the smaller pulley 22, and having an auxiliary belt 18 which couples these two pulleys 21, 22. The step-up belt drive also contains a smaller pulley 23 which is seated in a rotationally fixed manner on the intermediate shaft 25, and on the one hand is in contact with the main belt 15 and on the other hand can be coupled to the large pulley 21, and thus connects the two belt levels. In this case, in more detail as shown in FIG. 3, the large pulley 21 is held on the intermediate shaft 25 via a ballbearing 33, while the small pulley 23 is held by means of a bolt 34. The bolt 34 is screwed into the end of the intermediate shaft 25 such that the intermediate shaft 25 is rotationally fixed on the bolt. In this manner, rotation of the small pulley 23 is transmitted directly to the intermediate shaft 25, whose rotation can possibly be used within the unit 19 containing it, in a manner which is of no further interest here.

The connection of the large pulley 21 to the small pulley 23 of the intermediate shaft 25 is implemented by two switching devices 16, 20 in the form of friction-locking coupling elements, in a manner as shown in FIGS. 3 and 4. Specifically, the large pulley 21 is designed as a ring having a U-shaped cross-section, in which an end drum casing 35 of the small pulley 23 coaxially engages. A roller freewheel 16 is located between the drum casing outer surface of the small pulley 23 and the radially opposite surface of the large pulley 21, as the friction-locking coupling element. Located between the drum casing inner surface of the small pulley 23 and the radially opposite surface of the large pulley 21 is a friction locking coupling element which contains brake shoes 26 which can be pressed resiliently against the drum casing surface of the small pulley 23 and to which there are assigned in each case one bolt/elongated hole/link guide 27 and one unlatching device which in each case consists of a roller 28 and an associated inclined surface link 29. The rotation direction is indicated in FIG. 4 by the arrow R. While the roller freewheel 16 is held on the small pulley 23, the friction-locking coupling element which contains the brake shoes 26 is held on the large pulley 21. This results in the following operation of the two friction-locking coupling elements 15, 20, as a function of the respective torque effect.

If, after previously having been at rest, a torque initially acts from the electrical machine 1 and thus from the large pulley 21, then the roller free wheel 16 enters the clamping position and in consequence produces a force fit between the large pulley 21 and the small pulley 23 of the intermediate shaft 25. In this way, for example, a starter torque can be transmitted from the shaft 30 of the electrical machine 1, via the step-up belt drive coupling, to the motor vehicle engine shaft 14. If, subsequently, the engine shaft 14 on another occasion runs faster in a driven manner, for example once starting of the internal combustion engine 13 has been completed, and the torque direction for this reason is inverted, then the roller freewheel 16 releases while the brake shoes 26, which rest in a resiliently elastic manner lightly against the small pulley 23 of the intermediate shaft 25, press more firmly against the opposite drum casing inner surface, as a function of friction and guided by their respective bolt/elongated hole/link guide 27 and, in this way, produce a force fit between the large pulley 21 and the small pulley 23 of the intermediate shaft 25, in this torque direction as well. This leads to the shaft 30 of the electrical machine 1 being driven by the crank shaft 14 via the step-up belt drive and, in consequence, at an increased speed which is suitable, for example, for the electrical machine 1 to provide a greater generator power. As soon as the speed of the large pulley 21 exceeds a specific preselectable limit, for example once the motor vehicle engine is running at increased speed, the rollers 28 press radially out wards, as a result of their centrifugal force, against their respectively associated inclined link running surface 29 and in this way push the brake shoes 26 back against the spring force influence, as a result of which the friction lock and hence the force fit are released. In this case, the rollers 28 enter, with a considerably smaller inclination angle, an inclined surface section which is connected radially on the outside to a radially internally located inclined surface section having a large inclination angle. This results in the radially inward acting restoring force. The radially inward acting restoring force is caused by the respectively contacting inclined surfaces in conjunction with the spring force which acts, for the rollers 28 in the radially outer inclined surface section having a smaller inclination angle being considerably smaller than in the radially internally located inclined surface section having a larger inclination angle. This has the consequence that, on the one hand, a high roller centrifugal force is required to push back and thus release the brake shoes 26. This is as a result of the greater initial inclination angle, for which reason the brake shoes 26 are not released until a relatively high engine speed limit is exceeded. As a result of which, the rollers 28 simultaneously enter the radially outer inclined surface region, which is more weakly inclined. On the other hand, the rollers 28 remain in this unlatched position even if the engine speed subsequently falls below this limit, since the remaining centrifugal force can itself compensate for the roller restoring force which is exerted by the inclined surfaces and is smaller in this position of the rollers 28. The small inclination angle of the radially outer inclined surface section is selected such that the centrifugal force is still greater than this roller restoring force even when the motor vehicle engine 13 is idling. In consequence, the brake shoes 26 remain permanently released until the large pulley 21 to a very large extent comes to rest, for example after the internal combustion engine 13 has stopped.

The arrangement of the auxiliary belt 18 on an intermediate shaft 25 makes it possible for the motor vehicle engine 13 to have a short structural length. Alternatively, it is possible to dispense with this intermediate shaft and for the auxiliary belt for the step-up belt drive likewise to be guided directly with respect to the crank shaft 14, as is the main belt 15.

The functional sequence which is preferably intended with the construction, described above, of the motor vehicle electrical system is explained in more detail in the following text.

Starting from a switched-off internal combustion engine 13, the starting of the engine is detected by the control unit 2 via a signal coming from the engine controller (3). The engine controller 3, for its part, detects via a suitable signal, the contact of the starter switch 4. The control apparatus 2 then moves the changeover switch 5 to its free connection 31, as a result of which the $B_+$ generator output is isolated. At the same time, the control unit 2 controls the current supply device 9 in such a manner that the latter 9 armature circuit of the electrical machine 1 for the duration of starting. Furthermore, the regulator 10 is controlled by a suitable control signal from the control unit 2 such that it sets a necessary excitation current during starting of the motor vehicle engine 13. At this point, the electrical machine 1 is operating as a starter motor during the starting process for the internal combustion engine 13. For this purpose, the torque is transmitted from the shaft 30 of the electrical machine 1, via the step-up belt drive coupling, to the crank shaft 14. In detail, the torque is transmitted via the pulley 22 to the shaft 30 of the electrical machine 1 and the auxiliary belt 18, initially to the large pulley 21 of the intermediate shaft 25.

As described above, in this case the torque acts from the electrical machine 1 to the roller freewheel 16 and, by means of a friction lock, produces the force fit to the adjacent, small pulley 23 on the intermediate shaft 25. From the small pulley 23, the torque is transmitted via the main belt 15 and the pulley 32, which is seated in a rotationally fixed manner on the crank shaft 14, to the crank shaft 14. It should also be mentioned that, during this starting process with the electrical machine 1 operating as a starter motor, the freewheel 17, which is located between the shaft 30 of the electrical machine 1 and the associated pulley 24 around which the main belt 15 loops directly, is released. This happens since the torque acts from the shaft 30 of the electrical machine 1. The use of the step-up belt drive in this direction results in the major step-down of the starter motor speed which is required for starting the internal combustion engine 13.

As soon as the engine controller 3 detects that the motor vehicle engine 13 is running, it sends a suitable signal to the control unit 2 which then controls the regulator 10 to reduce the high starter excitation current, and controls the current supply device 9 to switch off. At the same time, the change over switch 5 is connected, by the control unit 2 and for a preselectable short time duration, to the output which is connected to the heating device of the exhaust gas catalytic converter 8. The electrical machine 1 is in this way used as a heating power generator for the exhaust gas catalytic converter 8. Since a comparatively high power is required for this purpose, the regulator 10, in this further mode, regulates the higher operating voltage, which is required for this purpose, of the electrical machine 1, so that the electrical machine 1 emits a considerably higher power than its rated power for the intended, relatively short time period. The operating voltage is increased from approximately 50 V, depending on the generator speed, compared with an on-board power supply voltage of approximately 14 V. The end of this operating phase with increased electrical generator power output from the electrical machine 1 is determined by a time circuit in the control apparatus 2 which then causes the regulator 10 to reduce the excitation current. Alternatively, it can be provided for the operating phase to be ended upon reaching a specific exhaust gas catalytic converter temperature, for which purpose a suitable temperature sensor and a connecting cable to the control apparatus 2 must be provided.

In parallel with the electrical changeover to this brief operating phase for emitting high power to the electrical machine 1, an automatic mechanical change over, which corresponds to this, is carried out as follows in the coupling of the crank shaft 14 and the shaft 30 of the electrical machine 1. As soon as the internal combustion engine 13 starts and runs as a result of the starting process, the crank shaft 14 quickly rotates faster, as a result of which the direction of the torque transmission is reversed. In consequence, the crank shaft 14 drives the small pulley 23 on the intermediate shaft 25, via the main belt 15. As a result of the torque transmission direction being reversed from that in the preceding starting process, the roller freewheel 16 is now released, while the friction-locking coupling element containing the brake shoes 26 produces a force fit from the small pulley 23 to the large pulley 21. The brake shoes 26 which are resiliently slightly in contact are driven as a result of their friction on the drum casing inner surface of the small pulley 23 and are pressed more firmly against the elongated hole link guide 27 as a result of being displaced in the elongated hole link guide 27. The torque which is transmitted from the small pulley 23 and large pulley 21 of the intermediate shaft 25 as a result of the force fit which is produced in this way is transmitted onwards from the large pulley 21, via the auxiliary belt 18, to the pulley 22 which is seated in a rotationally fixed manner on the shaft 30 of the electrical machine 1. As a result of which, the electrical machine 1, which is changed over to generator operation in circuitry terms as described above, is driven by the crank shaft 14 with the speed of its shaft 30 being increased. The speed increase is implemented by means of the step-up belt drive. The freewheel 17, which is arranged in the second pulley 29 on the shaft 30 of the electrical machine 1, also remains released in this operating phase. This is because the shaft 30 of the electrical machine 1 is driven faster via the step-up belt drive than the pulley 24, via its circumference, by means of the main belt 15. The higher step-up ratio of the step-up belt drive in comparison with the normal belt drive which is implemented by the direct coupling via the main belt 15 results in the increased speed of the shaft 30 of the electrical machine 1 which, together with increased excitation current, ensures that the generator output voltage of the electrical machine 1 is increased.

When the control unit ends this heating power generator operating phase of the electrical machine 1 by controlling the regulator 10 to reduce the increased excitation current, it simultaneously connects the changeover switch 5 to that output which is connected to the on-board power supply cable 7. The electrical machine 1 in consequence now functions in a further mode, as a normal on-board power supply generator, the regulator 10 regulating the generator output voltage to the normal on-board power supply voltage, by producing a suitable excitation current.

A further changeover in the mechanical coupling of the electrical machine 1 to the internal combustion engine 13 also takes place independently of this in time when the crank shaft speed for the first time exceeds a predetermined limit. This limit is also determined by the selection of the spring force for the brake shoes 26 and the design of the link inclined surfaces 29 within the brake shoe friction-locking coupling element. This is because exceeding this crank shaft speed limit also results in the small pulley 23 on the intermediate shaft 25 exceeding a specific speed. The small pulley 23 is coupled to the crank shaft 14 via the main belt 15, and, as a result of the force fit which is present in this phase through the brake shoe friction locking coupling element, also in the adjacent large pulley 21 exceeding a specific speed. This in turn has the effect that, as a result of the centrifugal force, the rollers 28 of the brake shoe friction-locking coupling element further enter the inclined surface link 29, radially outwards, as a result of the speed limit being exceeded and push the brake shoes back against the spring force. As a result of this, the force-fitting connection is released and, for the reasons described in detail above, remains released during further operation of the motor vehicle engine by the rollers 28 remaining in this radially outer position until the speed is very largely reduced and, in any case, has fallen below a value which corresponds to the engine idling. As a result of this single event of permanent unlatching of the brake shoe friction-locking connection with the roller freewheel 16 continuing to be released, the shaft 30 of the electrical machine 1 is from now on no longer driven via the auxiliary belt 18 and hence the step-up belt drive. Thus, the freewheel 17 now engages in the pulley 24, which is connected to the main belt 15, on the shaft 30 of the electrical machine 1. In consequence, from now on, the shaft 30 of the electrical machine 1 is driven by the crank shaft 14, for normal on-board power supply generator operation, via the normal belt drive, that is to say via the main belt 15 and the associated pulley 24 on the shaft 30 of the electrical machine 1.

As can be seen, the use of the step-up belt drive enables, on the one hand during starter operation, the provision of a suitably high torque from the electrical machine 1 to the crank shaft 14 and, on the other hand, during heating power generator operation, the provision of a high speed for the electrical machine 1. The switching devices 16, 20 which are provided in the step-up belt drive and are in the form of mechanical friction-locking coupling elements produce the respective connection of the step-up drive without any speed difference, or with a speed difference which is only extremely small, between the input drive side and the output drive side. On reaching a limiting speed, the step-up drive is once and automatically deactivated for the duration of the subsequent engine running operation. It should be noted that all these mechanical switching processes in each case take place automatically, without any external control. During the step-up drive phase, the normal drive is decoupled by the freewheel 17 which is furthermore provided.

It is self-evident that the engine controller 3 limits the speed of the motor vehicle engine 13 after starting until the short time duration for extracting high power for the exhaust gas catalytic converter heating has elapsed, in order that the decoupling of the brake shoe friction-locking coupling element, which is caused independently of this by the motor speed exceeding the limit, and hence the deactivation of the step up belt drive, do not take place until after this heating power generator phase. In this case, the deactivation of the step-up belt drive and the activation of the normal belt drive initiated by it do not need to take place at the same time as the initiation of the on-board generator operation for the electrical machine 1 by the control unit 2. Instead of this, it is advantageous that, as a result of the speed limiting during the heating power generator operation, the step-up belt drive does not take place until the speed limit has been exceeded for the first time during the on-board power supply generator operation of the electrical machine 1 so that, in the initial on-board power supply generator operation, more electricity can be supplied to the on-board power supply as a result of the step-up belt drive still being activated.

In addition to the alternative possibilities already discussed, further variations which are obvious to the person skilled in the art are, of course, possible in the context of the invention, for example a conventional step-up drive of any type may possibly be used instead of the above step-up belt drive. In addition, depending on the application, the additional function of the electrical machine as a starter motor may be omitted, the current supply device for the armature circuit then not being necessary. It is furthermore self-evident that any other electrical load, instead of the heating device described for the exhaust gas catalytic converter, may be connected to the electrical machine in the mode in which it at least briefly emits greater power, preferably greater than its rated power, which load has a comparatively high power consumption for the given time duration. Moreover, depending on the application, it is possible to dispense entirely with the arrangement of the step-up drive and to bring about the production of the greater power by the electrical machine just by means of a suitably greater excitation current. The electrical part and the mechanically coupling part of the above system can, of course, in each case be used separately in other systems.

It can furthermore be provided for the action on the engine controller to limit the engine speed to be carried out during the brief supply of the load having the high power consumption and thus to ensure that the step-up drive is activated in this operating phase as a function of the respective driving situation. Instead of the changeovers by the control unit and/or in the mechanical coupling device by means of the various mechanical switching devices, which changeovers are carried out automatically in each case and independently of one another in the above example, coupling of these changeovers can alternatively be provided, for example by the use of electrically controllable switching devices in the mechanical coupling of the electrical machine and motor vehicle engine, and suitable control cables from the control unit to such controllable switching devices.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A motor vehicle electrical system, comprising:

an electrical machine, having an output shaft, operable in a first mode as an on-board power supply generator and, in a second mode, as a supply for an electrical load having a comparatively high power consumption;

a regulator for setting an excitation current for said electrical machine;

a controllable changeover switch connected to said electrical machine;

a control unit for optionally controlling the operation of said regulator and changeover switch in said first or second modes;

wherein in said first mode said changeover switch connects a supply voltage output of said electrical machine to an on-board power supply cable, and wherein said regulator regulates an operating voltage of said electrical machine at a lower nominal value suitable for said on-board power supply; and wherein in said second mode said changeover switch connects the supply voltage to said supply for said electrical load, and wherein said regulator regulates the operating voltage at a higher nominal value suitable for said electrical load having the comparatively high power consumption; and a coupling device for coupling said output shaft of said electrical machine to a motor vehicle engine shaft with a different step-up ratio for said first and second modes.

2. Motor vehicle electrical system according to claim 1, wherein said coupling device comprises:

a normal belt drive coupling and a step-up belt drive coupling from said motor vehicle engine shaft and said output shaft of the electrical machine, a first switching device for activating said normal belt drive coupling in said first mode and for deactivating said normal belt drive coupling in said second mode; and a second switching device for activating said step-up belt coupling in said second mode and deactivating said step-up belt coupling in said first mode.

3. Motor vehicle electrical system according to claim 2, wherein said second switching device is a friction-locking coupling element which is arranged such that it acts between two associated pulleys and, after the engine has been started, produces a force-fitting connection when torque acts from said motor vehicle engine shaft, said force-fitting connection is automatically released on reaching a preselectable engine speed limit, and remains released during further operation of said engine.

4. Motor vehicle electrical system according to claim 3, wherein said electrical machine can be operated in a third mode as a starter motor, and further comprising:

a current supply device being provided for the armature circuit of said electrical machine, and wherein in said third mode, when a starter signal occurs, the control unit firstly controls the regulator to set a starter motor excitation current value, secondly controls the changeover switch to connect the supply voltage output of the electrical machine to a free connection, and thirdly activates the current supply device and, when a later signal occurs which represents the starting of the motor vehicle engine, the control unit deactivates the current supply device and changes the regulator and the changeover switch into their functional positions for the second mode and, after a preselectable time duration has elapsed, into their functional positions for the first mode.

5. Motor vehicle electrical system according to claim 4, further comprising a third switching device in the form of a freewheel, which is arranged such that it acts between said associated pulleys for the step-up belt drive coupling, said freewheel producing a force-fitting connection in the event of the action of the torque from the shaft of the electrical machine.

* * * * *